United States Patent [19]

del Valle

[11] 4,372,906

[45] Feb. 8, 1983

[54] METHOD AND APPARATUS FOR PRE-CASTING STEEL REINFORCED CONCRETE BOX-LIKE MODULES

[75] Inventor: Jaime L. del Valle, Rio Piedras, P.R.

[73] Assignee: Master Modular Homes, Inc., Toa Baja, P.R.

[21] Appl. No.: 223,434

[22] Filed: Jan. 8, 1981

Related U.S. Application Data

[62] Division of Ser. No. 942,377, Sep. 14, 1978, Pat. No. 4,272,050.

[51] Int. Cl.$^3$ .......................... B28B 21/60; B29C 7/00

[52] U.S. Cl. ................................ 264/256; 264/279.1; 264/333; 264/336

[58] Field of Search .................. 264/256, 33, 333, 31, 264/35, 334, 336, DIG. 43, 297, 250, 259, 271.1, 279, 279.1; 249/83, 144, 184, 18; 52/79.1, 220, 125

[56] References Cited

U.S. PATENT DOCUMENTS

| | | | |
|---|---|---|---|
| 1,045,587 | 11/1912 | Morley | 264/278 |
| 2,592,634 | 4/1952 | Wilson | 52/220 |
| 2,906,294 | 9/1959 | Peterson | 264/35 |
| 3,157,098 | 11/1964 | Mason | 264/31 |
| 3,277,556 | 10/1966 | Platt et al. | 264/35 |
| 3,376,012 | 4/1968 | Grammer | 249/184 |
| 3,466,000 | 9/1969 | Southern et al. | 249/93 |
| 3,678,693 | 7/1972 | Markewitz et al. | 249/11 |
| 3,689,019 | 9/1972 | Ferene | 264/33 |
| 3,696,177 | 10/1972 | Holland | 264/33 |
| 3,742,102 | 6/1973 | Stickler | 264/256 |
| 3,923,436 | 12/1975 | Lewis | 264/33 |
| 4,065,905 | 1/1978 | Van Der Lely | 52/79.1 |
| 4,142,705 | 3/1979 | Miller | 249/93 |

*Primary Examiner*—Willard E. Hoag
*Attorney, Agent, or Firm*—Hubbell, Cohen, Stiefel & Gross

[57] ABSTRACT

Method and apparatus for pre-casting box-like reinforced concrete modules on assembly line. Apparatus includes pair of movable interior forms for defining the interior surfaces of side walls and ceilings whereby one interior mould at a time can be removed when concrete is in semi-cured condition. Method includes casting floor with short upstanding side wall portion to serve as guide for interior forms when moving forms onto floor slab. Method also includes use of integral multiples of four serially arranged casting beds on which various procedures for forming modules proceed simultaneously and progressively.

10 Claims, 20 Drawing Figures

FIG. I.

METHOD AND APPARATUS FOR PRE-CASTING STEEL REINFORCED CONCRETE BOX-LIKE MODULES

This is a division of copending U.S. patent application Ser. No. 942,377, filed Sept. 14, 1978, now U.S. Pat. No. 4,272,050, assigned to the assignee hereof.

BACKGROUND OF THE INVENTION

1. Field of the Invention

This invention relates to a method and apparatus for casting steel reinforced concrete structures and especially to pre-casting steel reinforced rectangular concrete structures for use as room modules in housing. Most particularly, the invention relates to a new and improved method and apparatus for maximizing the production and reducing the cost of steel reinforced pre-cast room modules by an assembly line.

2. The Prior Art

Concrete fabrication falls into two major categories: cast in place concrete and pre-cast concrete. Cast in place concrete has the advantage of permitting a great deal of flexibility as to the form or shape of the structure being made, whereby to yield building configurations that are not readily achievable with any other known method of fabrication. However, cast in place concrete methods are basically tailor-made methods and are therefore quite costly of time, labor and materials. They often require the establishment of an elaborate facility at the construction site.

The other process commonly employed in fabricating buildings from concrete is the use of pre-cast concrete. This manifests itself in different forms such as pre-cast concrete beams which are incorporated in buildings otherwise built at the site, or precast slabs to form floors on skeletal steel buildings, the construction of pre-cast slabs which are then joined together at site to form rooms and the formation of rectangular box like structures that can serve as an enclosure for one or more rooms. The latter two of these techniques of pre-casting have lent themselves to some degree of mechanization, whereby to increase the productivity of the labor and reduce costs. As a result it has been heretofore recognized that the pre-casting of concrete, including the pre-casting of concrete rectangular modules does provide an opportunity for increased production at lower costs.

There are numerous attempts in the prior art to facilitate the production of pre-cast reinforced concrete structures. U.S. Pat. No. 3,689,019 granted to Joseph W. Ferenc on Sept. 5, 1972 for Apparatus for Shuttering Poured Concrete Structures discloses a method and apparatus for forming inverted U-shape reinforced concrete structures. However, Ferenc does not confront the problem of maximizing such production especially when there is an overhead concrete ceiling to be supported. Moreover, while the internal form for the U-shaped member is movable, there is no suggestion of progressing it or the external form from location to location to maximize production. In fact, Ferenc visualizes the use of his apparatus to casting in place. Similarly, in U.S. Pat. No. 3,696,177 granted to Harry L. Holland on Oct. 3, 1972 for Method For Forming Concrete Box Culverts And The Like, a method and apparatus is disclosed for forming a hollow tunnel like structure out of concrete. However, the apparatus includes a unitary internal form that cannot be moved in whole or in part until the entire roof of the culvert is able to support itself, whereby to reduce the productivity of the form. Secondly, despite the fact that the internal form in the Holland patent is provided with casters, there is no suggestion of utilizing such a form with a series of separate casting beds and progressing the form from bed to bed for the purpose of creating an assembly line for the formation of reinforced concrete structures. In fact, the Holland patent does not even consider the longitudinal movability of the external form, it being apparent from the disclosure that they are moved only perpendicularly of their forming plane. Thus the Holland structure is not susceptible for use in an assembly line type operation. In U.S. Pat. No. 3,834,110 granted to Michele Verseluto on Sept. 10, 1974 for Method For The Manufacture of Prefabricated Housing Units, a method of making such rectangular concrete structures is described. However, this method requires the pre-casting of separate slabs forming the various surfaces and then the joining of the slabs by additional poured concrete.

Other prior art patents of lesser interest but known to applicant are Quentin U.S. Pat. No. 3,482,005 granted on Dec. 2, 1969 for Method Of Constructing Concrete Building and U.S. Pat. No. 3,963,395 granted to John L. Bordo on June 15, 1976 for Mass Production Line For Fabricating Structural Building Members.

SUMMARY OF THE INVENTION

This invention relates to an assembly line method and apparatus used therein for forming at high speed box like precast concrete building modules. The method operates in conjunction with multiples of four concrete casting beds on which various operations are performed in sequence to enable the production of one completed structure each two days of use. The method includes the formation of a floor slab having small upstanding wall portions at the sides thereof which wall portions serve as guides to a pair of complementary interior forms when they are moved onto the slab. The interior forms provide interior vertical and horizontal forming surfaces and are independently movable on casters. A pair of external forms cooperates with the internal forms for defining the vertical sidewalls of the module after the formation of the floor slab and adjacent wall structures. These are provided for carefully aligning the two sets of forms, that is the set of interior forms and the set of exterior forms, so that the produced structures are properly formed in a rapid fashion. There are many other details of the method and apparatus that are omitted from this summary that are important to the invention herein described.

DETAILED DESCRIPTION OF PREFERRED EMBODIMENTS

Figure 1:
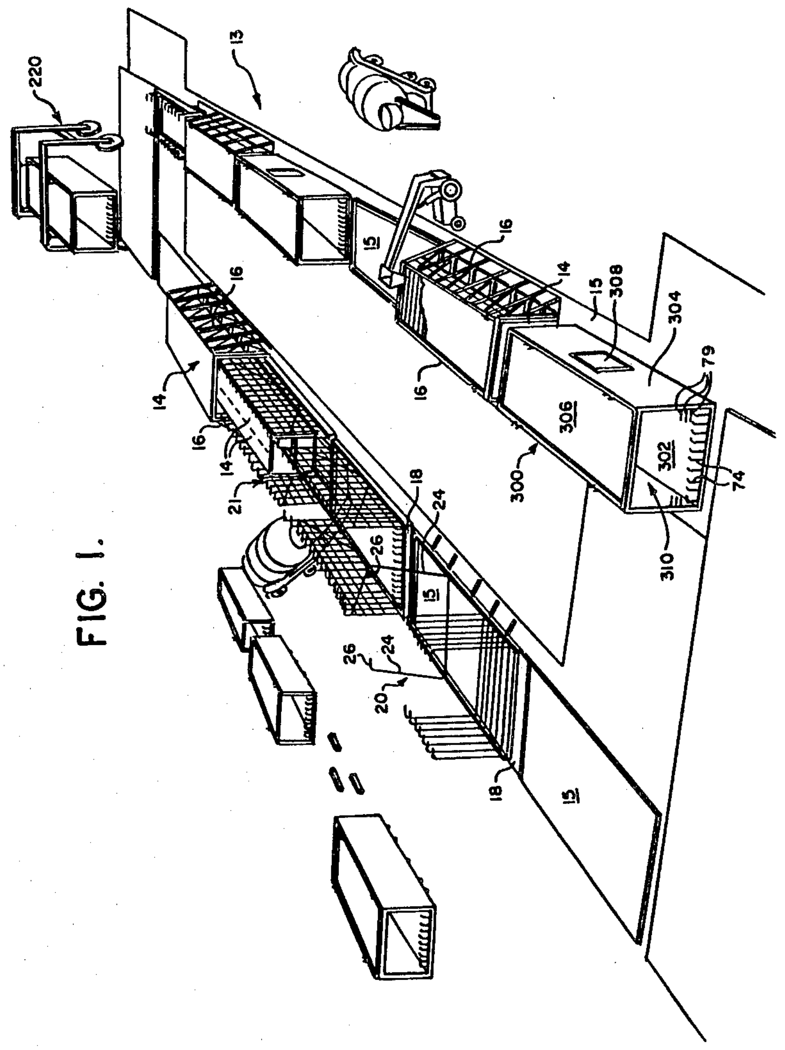
FIG. 1 is a perspective view, partially schematic, illustrating an assembly line embodying the presently preferred form of my method and apparatus.

While the method and apparatus of the present invention may be employed to form modules in a variety of ways, they find their maximum utilization in an assembly line of the type illustrated in FIG. 1. FIG. 1 illustrates a completed pre-cast monolithic concrete module 300 including a floor 302, two longitudinally extending side walls 304 and a roof 306. A window opening 308 is shown in one side wall. Not shown are end walls which may partly or completely cover the end openings 310. However, steel reinforcement means in the form of vertical rods 74 and horizontal rods 79 extending respectively from the floor and side walls are shown in preparation for the subsequent inclusion of a cast concrete end wall.

In FIG. 1 the assembly line is generally designated by the reference numeral 13 and comprises three sets of casting beds 15, each set including four casting beds. The full advantages of the assembly line 13 of FIG. 1 can be realized whenever a set of interior forms 14 and a set of exterior forms 16 are associated with four casting beds 15. Thus in the assembly line 13 of FIG. 1, it will be seen that there are three sets of interior forms 14 and three sets of exterior forms 16, one set for each four casting beds 15. Clearly, if there were 16 casting beds, then, to maximize the utilization of the installation, there would be included therewithin an additional set of interior forms 14 and an additional set of exterior forms 16. This can be added to essentially without practical limits.

Each of the casting beds 15 is essentially simply a slab of reinforced concrete for supporting the casting operation. Preferably steel angles are embedded in the longitudinal corners to prevent chipping (not shown). In between adjacent casting beds 15 there is a raised concrete spacer 18, the height of which exceeds the upper surfaces of the casting beds by the thickness of the floor slab to be poured in the concrete module formed by the present method and apparatus. The reason for this will become apparent hereinafter. Further reference to FIG. 1 will be made hereinafter in describing the preferred form of practicing the method of the present invention.

However, as already noted, the method has distinct advantages even when not employed in its preferred form as illustrated in FIG. 1. Likewise the apparatus for forming the concrete module also is highly desirable even when not used in the preferred assembly line 13. Hence, the method will first be described without reference to the use of the assembly line 13 of FIG. 1.

Figure 2:
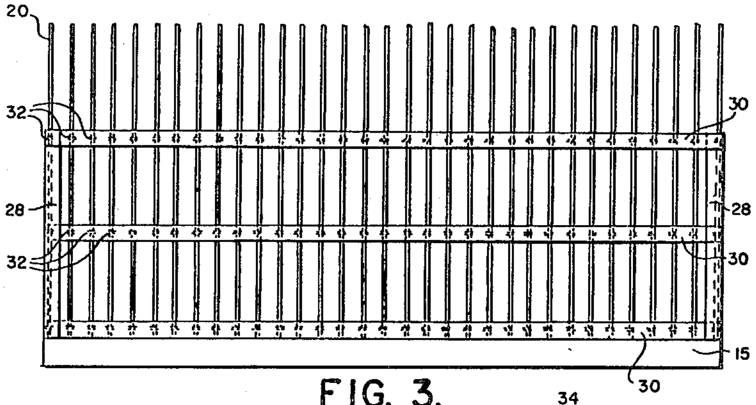
FIG. 2 is a side elevational view of an array of U-shaped steel reinforcing members held in parallel planar position by a temporary holding means preparatory to casting the floor slab in accordance with the present invention.

Referring now to FIG. 2, a side elevational view of a single casting bed 15 is illustrated. The first step in constructing a concrete module 300 is to erect an array of substantially U-shaped reinforcing rods so that they are in parallel planar arrangement for the purpose of defining the floors and the walls of the module in formation. As may be seen in FIG. 1, the U-shaped reinforcing rods 20 include a base portion 22 of about the width of the module in formation (exterior module width minus thickness of one wall), a pair of upstanding side portions 24 of about the height of the walls of the module (exterior module height minus one-half of nominal roof thickness) and two inwardly directed colinear end stub portions 26 which will rest within the plane of the roof of the module after formation. While the reinforcing bars can be made of any well known commercially available steel reinforcing stock, it is presently preferred that a reinforcing bar number 4 be employed, which bar has a $\frac{1}{2}''$ diameter and a steel designation of ASTM A-615-Grade 40. Preferably, the bars are formed into the U-shaped configuration illustrated either at the steel factory or off-site from the assembly line 10. The manner of forming these bars forms no part of the present invention.

To hold the bars in vertical planar parallel relation as shown in FIG. 2, a temporary holding means is employed. It is presently preferred that the holding means be in the form of a wooden structure, much like a fence, having a pair of vertical end members 28 that are fastened to three horizontal members 30 which extend essentially the full length of the module in formation. The fence is held in vertical position along the sides of the casting beds by any suitable means such as horses or wooden bracing or the like and the U-shaped reinforcing rods 20 are moved into vertical position and then are fastened to the horizontal members 30 of the fence structure by any suitable removable fasteners such as by a pair of closely spaced apart nails. The nails are illustrated in FIG. 2 and generally designated by the reference number 32. With the fences on both sides of the casting bed 15 serving to temporarily hold the U-shaped rods 20, the rods can be arranged in the array as shown in FIG. 2. While the spacing of the rods is dictated by the desired strength for the module in formation, it is presently preferred that they be spaced at about 11" when employing wall thicknesses and roof thicknesses and floor thicknesses of the type hereinafter to be described. Clearly, other spacings could be employed for different strength levels and the spacings would necessarily be adjusted for different slab thicknesses, these adjustments being well within the ability of persons of ordinary skill in the art.

Figure 3:
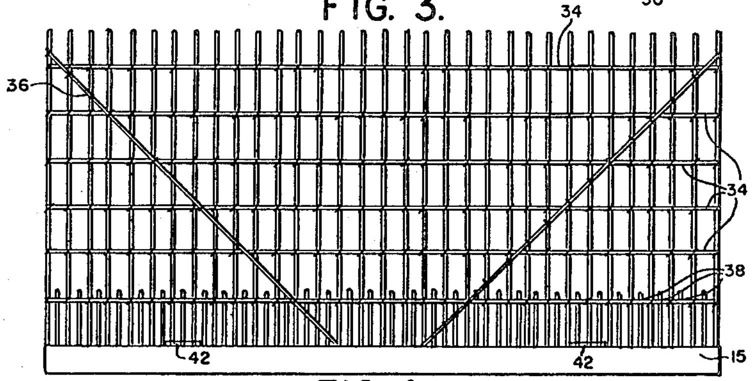
FIG. 3 is view similar to FIG. 2 showing said steel reinforcing structure completed but prior to the pouring of the floor slab.

After the U-shaped members are placed in the position shown in FIGS. 2 and 3, longitudinal reinforcement members 34 are connected to each of them by suitable interconnecting means such as, for example and as presently preferred, by wire wrapped at selected intersections although, as shown though not preferred, it may be at all intersections. The number and spacing of the longitudinal rods 34 is again dictated by desired ultimate physical properties but in the presently preferred form there are employed six horizontal rods 34 all spaced from one another at about a foot apart. In addition, as presently preferred, to add further rigidity to the reinforcement structure, diagonal reinforcements 36 may be added to the wall portion of the reinforcements and connected to the horizontal rods 34 and vertical rods 36, respectively, by suitable means such as by wires wrapped around both rods at some or all intersections. The horizontal and diagonal reinforcement rods 34 and 36 may be and preferably are made of the same type of reinforcing bar as the U-shaped reinforcing rods previously disclosed but are preferably of $\frac{3}{8}$" diameter. Of course, other types of materials and dimensions may be employed for these rods without departing from the invention.

To strengthen the two lower longitudinal corners of the module in formation, right angle bent reinforcing rods are disposed in between adjacent U-shaped reinforcing rods 20. The right angle bent rods may be made and preferably are made of the same material as the U-shaped rods 20 but are of much smaller length, of the order, for example, of 24" to a leg. The right angle bent rods are designated by the reference numeral 38 and they are connected into the structure as by wires wrapped around them and any horizontal rod 34 to which they intersect.

Figure 4:
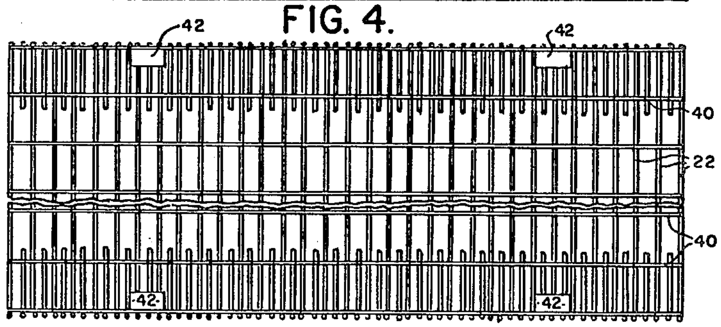
FIG. 4 is a fragmentary top plan view of the structure in FIG. 3.

During the same operation as the installation of the horizontal reinforcing rods 34 in the walls, longitudinal reinforcing rods 40 are laid over base portions 22 of the U-shaped reinforcing rods 20 as may be seen in FIG. 4. The right angle reinforcements 38 generally extend far enough away from the wall to be connected to the two sidemost floor longitudinal rods 40 as by wrapped wire.

Once the structure reaches the described condition, the fence structures serving as a temporary holding means for the array of U-shaped reinforcing members 20 can be removed since the reinforcing structure now has sufficient rigidity to hold itself up. The removal is simply accomplished by pulling the fence away from the planes defined by the side portions 24 of the U-shaped members 20 whereby to tear them away from the staples 32 and to flex the nails to pass vertical legs 22 of U-shaped reinforcements 20. This condition, that is with the structure with the reinforcing structure self-supporting, is shown in FIGS. 3 and 4.

The reinforcing structure preferably includes four connecting plates 42, each in the plane of the floor adjacent the walls of the structure. The plates 42 are preferably made of steel and are preferably integrated into the reinforcement structure as by welding. The purpose of the reinforcement plates is to facilitate mounting on foundation footings after completion of the module. This mounting on the foundation may be as by welding.

Figure 9:
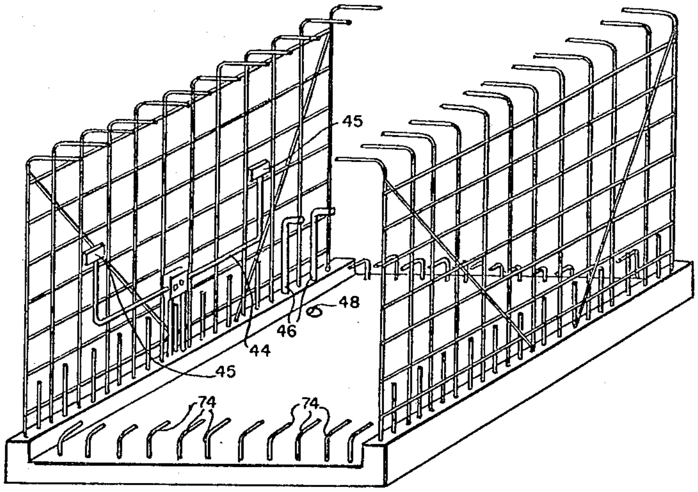
FIG. 9 is a perspective view of a partially completed room module made in accordance with the present invention showing a completely poured floor slab and the reinforcement array for the wall and including therewithin facilities for electrical distribution and plumbing.

If the room module is to include an electrical installation and/or plumbing, the wiring conduits and/or the piping for the plumbing is installed at this point in the process. While such piping and conduits are not shown in FIGS. 3 and 4, they are illustrated in FIG. 9 where the electrical conduits are designated by the reference numeral 44, the receptacle boxes are designated by the reference numeral 45, the plumbing piping is designated by the reference numeral 46 and a drain or sewer line opening is designated by the reference numeral 48.

Figure 5:
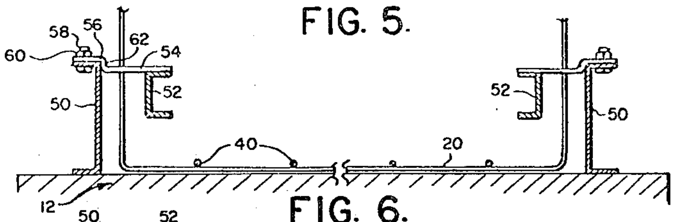
FIG. 5 is a vertical sectional view showing the form employed for the floor slab in accordance with the present invention.

Once the reinforcement structure is assembled as described above and illustrated in FIGS. 3 and 4 (plus plumbing and electrical installations if required), provision can be made for pouring the floor slab for the structure. This is done by disposing in operative relationship with the steel reinforcement structure a pair of floor forms, each pair comprising two channel members. The floor forms are shown best in FIGS. 5 and 6 and include an outer channel member 50 which rests on the casting bed 15 and an inner channel member 52 of substantially smaller size, specifically of a size wherein the web is shorter than the web of channel 50 by about the thickness of the slab to be poured. Thus, prior to the actual pouring, the channels 52 would appear from the drawings to be floating in air at a distance from the surface of the casting bed equal to the projected thickness of the floor slab to be poured. This is accomplished by employing a plurality of transversely extending support straps 54 which are preferably permanently affixed to the upper flange of the channel 52 as by welding, although, of course, other means of securing may be employed such as nuts and bolts or rivets or the like. Preferably, although not necessarily, for a reason which will become apparent hereinafter, the outer end portion 56 of each of the straps 54 is somewhat vertically offset upwardly. Irrespective of whether the offset is included, the end portions 56 of the straps 54 are provided with apertures for receiving the threaded portion of an upstanding bolt 58 for securing the straps to the upper flange of the companion channel member 50. While the bolts may be inserted after the apertures in the end portions 56 of the straps 54 register with similar apertures in the upper flange of the channel member 50, it is presently preferred that the bolts 58 be welded to the upper flange of the channel 50, whereby the channels 52 with their outstanding welded on straps 54 may be moved into parallel relation with the outer channel 50 and thence downwardly so that the apertures in the end portions 56 will fit around the upstanding bolts 58 welded to the upper flange of the channels 50 and then may be secured by threading with suitable nuts 60. Registration is facilitated by the shoulders 62 defined by the upstanding portions of the straps 54 which abut against the web of the channels 50 when the proper spacing between the two channels is achieved for defining the lowermost portion of the sidewall of the module. It will be obvious that the straps be located so as to not interfere with the vertical upstanding portions of the U-shaped reinforcements 20.

Figure 6:
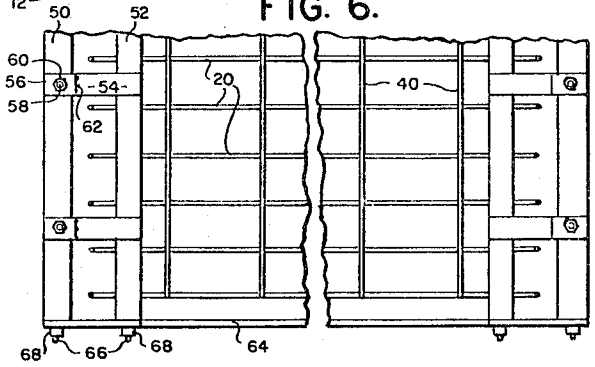
FIG. 6 is a top plan view of the forms shown in FIG. 5.
Figure 7:
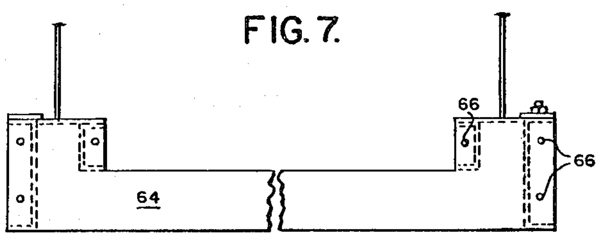
FIG. 7 is a fragmentary end view of the forms for the floor slab of the structure to be made in accordance with the present invention.

To define the ends of the floor forms made up of the channels 50 and 52, a pair of end plates 64 is employed, one for each end. The end plates 64 are basically U-shaped in configuration and overlie the end space between the confronting channels 50 and 52 and the space between the two inner channels 52 to a height of at least the height of the slab to be poured. The end plates may be secured to the ends of the channels in any suitable fashion such as, as shown in FIG. 7, by providing end brackets on the channels 50 and 52 with protruding bolts 66 which extend through apertures in the plates 64 spaced to receive the bolts. Thereafter, nuts 68 may be threadedly placed on the bolts to secure the plates 64 as shown in FIGS. 6 and 7.

With the form so completed the forms 50 and 52 and the casting bed 15 are coated with a form oil for promoting the removal of the forms from the finished slab and the finished slab from the casting bed. Form oils are very conventional and well known and any of them will serve the described purpose satisfactorily. In practicing the method I have employed Magic Cote with good results.

After the forms and the casting bed have been coated with a form oil, the floor slab is ready to be poured. While any suitable concrete mix may be employed for this purpose and the particular mix would depend on characteristics that are desired, a satisfactory concrete mix to form one yard of concrete for use in pouring the floor slab is presented below as an example of the presently preferred mixture.

Cement: 569 lbs.
Coarse aggregate (100% through a 1" screen): 1,350 lbs.
Fine aggregate (sand): 1,470 lbs.
Water: 358 lbs.
Early strength promoting additive (DARATAR): 17 lbs.

The early strength promoting additive is a commercial product well known to those people with ordinary skill in the art of making concrete structures. Satisfactory results have been achieved using DARATAR brand additive for this purpose.

Figure 8:
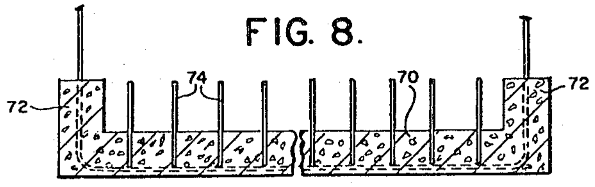
FIG. 8 is a sectional view of a completed floor slab made in accordance with the present invention.

While the concrete may be mixed if any of many well known fashions, it is presently preferred that the concrete be mixed in a mobile mixer which can then be employed to dump the concrete onto the casting bed to the desired height, for instance 4". At the same time, and in accordance with the present invention, the very lowest portions of the sidewalls of the module in formulation are poured so that the completed slab structure is not flat but U-shaped as may be seen best in FIG. 8. As seen in FIG. 8 the floor slab is designated by the reference numeral 70 and the lower wall portions by the reference numeral 72. Preferably the thickness of the lower wall portion 72 is also about 4" and extends upwardly from the upper surface of the slab for about 4", namely the height of the channel 52. The lower webs of the channels 52 define the upper surface of the slab 70. Clearly, the viscosity of the concrete mix must be great enough to support the upstanding wall portions 72 while the concrete is still in a viscous state. The mix above specified achieves this admirably. Of course, other mixes can do the same thing. The concrete mix is also desirable because, for the section thickness herein employed, it cures sufficiently (partial cure) in one day to support, preferably with the aid of guide rails, the weight of interior forms. Such one day partial cure results in sufficient strength so that a roof span of about six feet is also self-supporting. In about three-and-a-half days, the concrete is "fully cured" which only means that it is entirely self-supporting in a building module 300. Clearly, even after reaching "fully cured" status after $3\frac{1}{2}$ days of curing, the concrete will continue to cure and gain additional strength.

Figure 16:
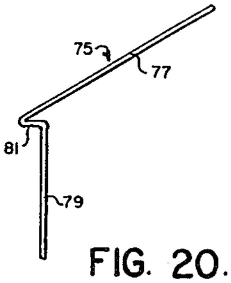
FIG. 16 is a perspective view of an end wall reinforcement rod.

After the mix has cured sufficiently to be self-supporting in the configuration described, the floor forms may be removed. Given the mix specified this occurs in about 3 hours time. The removal of the forms 50 and 52 and the end plate 64 is a simple speedy operation facilitated by the form oil sprayed on prior to pouring. Long before the forms are removed, immediately after casting the floor, additional reinforcement is introduced along the two ends of the floor slab if end walls are to be constructed. This is achieved by taking a group of L-shaped reinforcing rods 74 each extending upwardly about 8" and having a horizontal leg of similar length and pushing them into the self-supporting but yet not set concrete floor. These L-shaped rods 74 are disposed along both ends, about 2" in from the outer end surfaces and provide reinforcement for end wall slabs poured much later in the process. Of course, if no end walls are to be constructed, then the L-shaped reinforcements 74 are not introduced. The reinforcements 74 may be made from the same stock as reinforcements 20. Of course if end walls are to be constructed, then, in addition to the L-shaped reinforcements 74 heretofore mentioned, additional L-shaped reinforcements 75 are also preferably employed. Reinforcements 75 are illustrated in perspective in FIG. 16 and include a horizontal leg 77 which is connectable horizontally to the vertically extending portions of the U-shaped reinforcing rods 20, a vertically extending leg 79 and a short connecting leg 81 which is horizontal and offset by approximately one-half the thickness of the wall in formation (e.g., two inches). Thus, when the leg 77 is tied to the vertical portion of the steel reinforcements as illustrated in FIG. 9, the vertical leg 79 thereof will lie approximately in the plane of the interior wall surface of the wall to be cast. As may be seen in FIGS. 9 and 17, it is preferred that three such reinforcements 75 are connected adjacent each end of each wall.

As will be more fully understood hereinafter, after the walls and roof are poured and the forms are removed, the reinforcements 74 are bent upwardly out of the plane of the floor and into the plane of the end wall to be constructed, the vertical legs 79 of the reinforcements 75 are bent out of the plane of the sidewalls of the module and into the plane of the end walls to be formed whereby to provide anchors or securements for additional reinforcements to make sure the end wall structure is strong and secure. As will be more fully understood hereinafter, the bending of the vertical portions 79 of the L-shaped members 75 out of the sidewalls leaves grooves in the sidewalls which provide additional interlocking between the sidewall concrete and the end wall concrete yet to be poured to further strengthen the structure.

Thereafter, the poured floor slab is permitted to set for about 24 hours which gives it adequate mechanical strength to support the interior forms for the walls and ceilings as will be described hereinafter. As will also be described, the interior forms are mounted on wheels and are rolled into position on the poured concrete slab. Since the wheels will cause a considerable stress concentration in their immediate vicinity, and since the concrete, even after one day of curing has not achieved its full strength, to receive the rolling interior forms, channel members are laid web down over the slab 70 to provide tracks for the wheels of the interior forms to roll on without damanging the floor slab 70. Also, to permit the rolling of the interior forms onto the tracks, the vertical portions of the end reinforcements 74 are bent downwardly as may be seen in FIG. 9 so as to prevent interference with the movement of the interior forms. As previously noted, in between each pair of adjacent casting beds 15 there is a concrete spacer 18 that has its upper surface elevated above the surface of the casting beds 15 by the thickness of the floor slab 70 to be cast. As will be more fully understood as this description progresses, the forms 14 and 16 are progressively moved serially from casting bed to casting bed as the process at each casting bed proceeds apace. To facilitate the movement of the interior forms 14 which are on wheels, channel members are laid onto the floor of a completely poured module, such as the module 19 in FIG. 1, and extend across the spacer 18 to the next adjacent module in which the floor slab has been poured and partially cured, said next adjacent module being designated by the reference numeral 21 in FIG. 1. To support the channel shaped rails in between the two casting beds supporting the slabs of structures 19 and 21, the spacer 18 in between is elevated to the height of the slab whereby to provide a substantially continuous planar surface between the two adjacent floor slabs to permit the easy movement of the internal forms 14 from one casting bed to the other.

Figure 10:
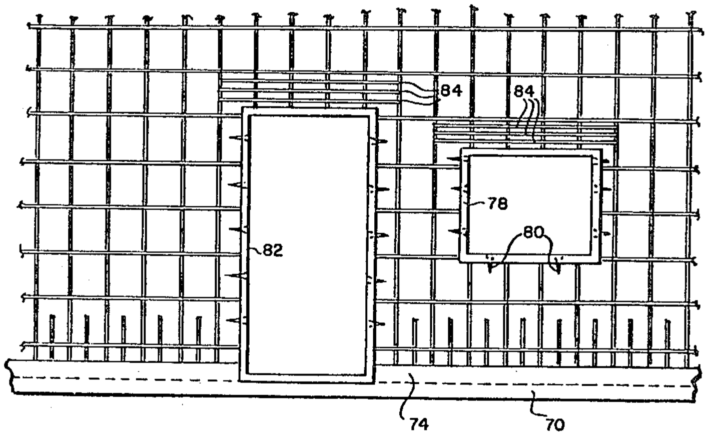
FIG. 10 is a side elevational view of structure similar to FIG. 9 but with provision for wall openings for a door and a window.

At about the same time that the channel shaped tracks 76 are laid over the slab 70 and the spacers 18 between adjacent casting beds, and the L-shaped end reinforcements 74 are bent down, if the finished module is to have any wall openings, such as doorways, windows, air conditioning sleeves or the like, the frames for these openings are integrated into the vertical portion of the steel framework. This step is best illustrated in FIG. 10. Specifically, for a window, the necessary portions of the vertical and horizontal reinforcement members are cut away to accommodate a pre-constructed rectangular wooden frame 78. The thickness of the frame is equal to the thickness of the walls to be cast. The frame can be tied in as by twine or wire or the like to hold it in position. Actually, in practice, the cutting of the reinforcement can be controlled to such an extent that friction between reinforcements and the frame will hold the frame. To further strengthen the integration of the frame within the structure after it is poured, distributed along the periphery of the frame are suitable protruding securing elements such as nails or the like which merely extend out into the air at the time of integration of the frame into the reinforcement structure. As will be seen, when the concrete is poured around the frame, it will envelope the nails and thereby firmly hold the nails and hence the frame 78 in the concrete structure. An almost identical procedure may be employed for air conditioning sleeves.

The method of incorporating a doorway is somewhat modified in that it is desirable for the door sill to be located essentially flush with the upper surface of the slab 70. Thus, before placing the door frame 82 into the steel structure of FIG. 10, it is necessary to cut away that portion of the upstanding wall part 74 in the doorway to permit the door frame 82 to rest on the floor slab itself. Apart from that, the manner of incorporation is exactly the same as that for a window or an air conditioning sleeve. Preferably, although not necessarily, to provide additional reinforcement over openings, additional horizontal steel reinforcing rods 84 are wired into the reinforcement structure above the opening as may be seen in FIG. 10. The structure is now ready to receive the forms for the walls and ceiling.

In order to fully appreciate the method, it is necessary to understand the structure of the forms for the walls and roof of the module in formation. These forms are best illustrated in FIGS. 11, 14 and 15, FIG. 11 being an end view of a set of interior and exterior forms in position for casting, FIG. 14 being a side elevational view of one of the exterior forms and FIG. 15 being a side elevational view of one of the interior forms.

Figure 11:
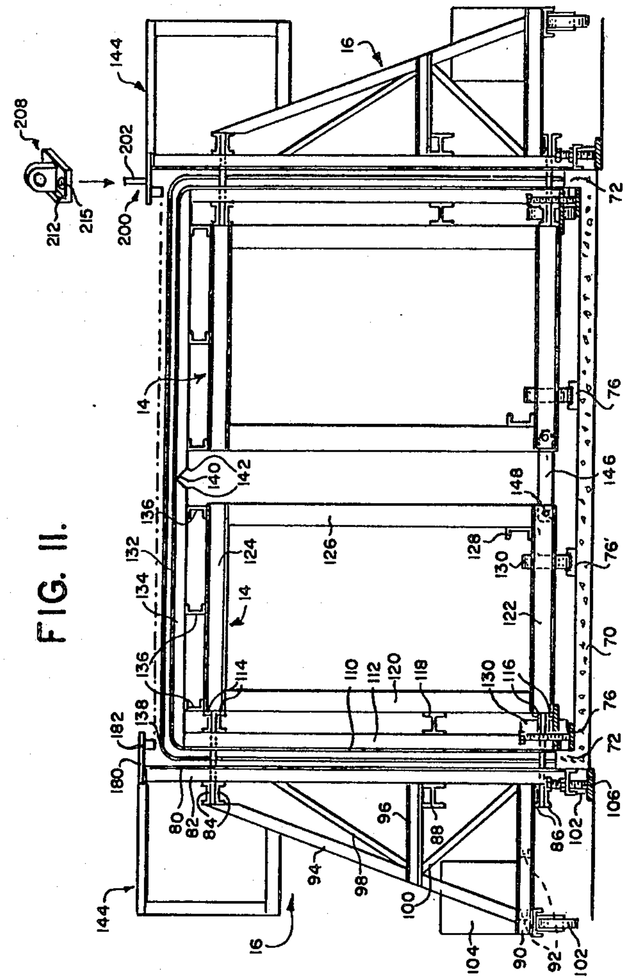
FIG. 11 is a side elevational view of the structure of FIG. 9 associated with a pair of external forms and a pair of internal forms preparatory to the pouring of the walls and ceilings of the module in construction.
Figure 14:
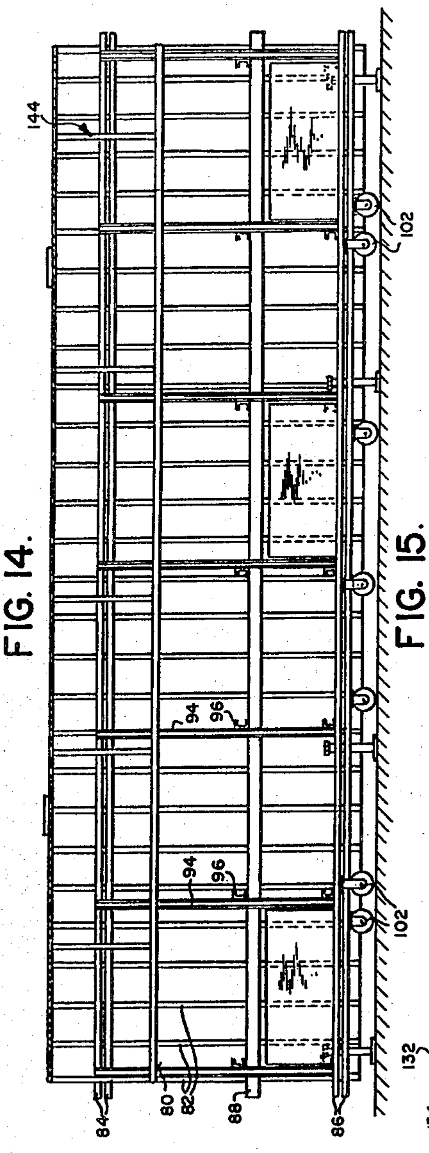
FIG. 14 is a side elevational view of an exterior form embodying the present invention.
Figure 15:
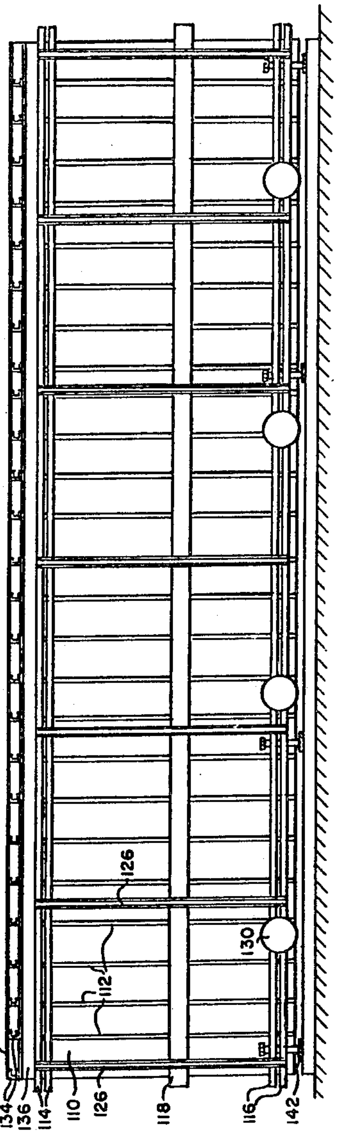
FIG. 15 is side elevational view of an interior form embodying the present invention.

With reference to the exterior forms shown in FIGS. 11 and 14, it will be appreciated that the only part of the form that actually serves as a concrete form in the sense of providing a surface complementary to the concrete surface in formation is a large flat vertical steel plate 80. Plate 80 has a length that is equal to the length of the side wall of the module, for example, about 28 feet, and a height equal to or greater than the module height, e.g., about 8 feet. Clearly, such a large steel plate, especially when its thickness is kept to a minimum to reduce weight, for example, a quarter-of-an-inch, will require reinforcement and the great bulk of the exterior form structure serves this purpose. Thus, disposed at about 13 inch intervals along the length of the plate 80 and backing the plate to provide it with stiffness are a group of vertically extending channels 82 that may be secured to the plate 80 as by welding or the like. For extra rigidity near the ends, the channels may be somewhat closer together as, for example, 12 inches apart. To further stiffen the plate 80, the channels 82 are themselves stiffened as by an upper pair of spaced apart confronting channels 84 that extend the full length of the plate 80, a lower pair of spaced apart confronting channels 86 that also extend the full length of the plate and an intermediate longitudinally extending reinforcement or stiffening member such as, for example, an I-beam 88. These are connected to the vertical channel members 82 in any suitable manner, such as, for example, welding. Extending horizontally outward in a direction perpendicular to the plane of the plate 80 and along the bottom just above the upper one of the lower channel members 86 are a plurality of channels 90. Actually, there are a number of channels 90 distributed along the length of the plate 80 in the position described, the number presently being about seven separated by slightly in excess of four feet each. Extending between the channels 90 are one or more longitudinally extending channels 92 (shown in dotted lines in FIG. 12). Extending upwardly from the ends of channels 90 to the upper pair of spaced apart channels 84 are a number, here shown as seven, of diagonal braces in the form of channels as well, although other rolled forms of stock may be employed. These diagonal braces are designated by the reference numeral 94. To stiffen the bracing in the form of a truss-like structure, additional horizontal members 96 extend outwardly from some of the vertical reinforcements 82 to the diagonal braces 94 and two pieces of reinforcement, here shown by way of example in the form of one inch round pipe reinforcements 98 and 100 extend from the points of intersection of the channels 96 and the diagonal braces 94 to separate points along the vertical reinforcement members 82. Thus, a truss-like structure is provided at various locations along the length of the plates 80 to reinforce those plates against bending. As already indicated, in the present embodiment, seven such truss-like structures are provided, although other suitable numbers may be employed.

To facilitate the movement of each of the exterior forms, secured to the bottoms of the channels 90 are pairs of casters 102, here shown to be seven in number, one pair adjacent each of the truss-like structures heretofore described. These casters are universally swiveled to facilitate movement of the exterior forms. Also, it will be seen that the great bulk of the weight of each of the exterior forms is on the inside of those forms adjacent the plate, whereby to render the structures intrinsically unstable. To stabilize the structures, one or more suitable counterweights, here shown in the form of concrete blocks 104, are disposed at the outermost portion of each of the exterior forms as on the channels 92. Finally, to prevent the movement of the exterior forms once they are in position for casting, a number of screw jacks 106 are mounted on each of the forms adjacent the plates 80 for supporting the forms in their operative position once they have been moved there by means of the casters 102 and hydraulic jack means to be described hereinafter. It will be seen from FIG. 11 that there are two exterior forms 16 which are identical in construction and they are used on either side of the module in formation.

In accordance with one feature of the present invention each interior form 14 is employed for only one half of the module in formation, it requiring two side-by-side interior forms in the processing of a complete concrete module. Each of the forms 14 includes an outer plate 110, preferably made of steel, and preferably of about one quarter inch thick. The plates 110 define the inner surface of the module wall in formation. To stiffen the plates 110, there are provided a plurality of vertically extending reinforcing channels 112 spaced about a foot apart, although they may be somewhat closer in the vicinity of the ends of the plate. These channels 112 may be secured to the plate 110 in any suitable manner as by welding. To stiffen further the plate 110, there is provided an upper pair of spaced apart channel members 114 that are alignable with the channels 84 on the exterior form when the two forms are positioned properly for use. There is also provided a pair of spaced apart lower channel members 116 that are alignable with the lower channel members 86 on the exterior form when the two forms are located properly for use. Intermediate the two pairs of channel members 114 and 116 and extending longitudinally of the plate 110 is a reinforcing I-beam 118. To further stiffen this grid-like reinforcing structure, there is provided at discrete locations along the length of the plate 110 a plurality, here shown as seven in number, of additional reinforcing vertical channels 120 secured to the outer ends of the channels 114 and 116 and the eye beam 118.

Secured to the channels 116 at discrete locations are a plurality of horizontal channels 122 and a like number of such channels 124 are secured near the top of each interior form 14. Extending from the inner ends of each of the members 122 and 124 are vertical structural supports 126 which may be in the form of channels or I-beams. To reinforce these members additional reinforcements 128 extending longitudinally of the plate 110 may be provided. Thus, an interior box-like structure is provided which may be supported by suitable universally movable casters 130 distributed along the length of each of the interior forms 14 to render them movable.

Each of the interior forms 14 includes a structure for defining the lower or ceiling surface of a roof of the module in formation. This structure is also a smooth plate 132 which rests upon a series of transverse channel members 134 that are supported in turn by longitudinally extending channel members 136 that in turn rest on and are connected to the channel members 124 supported by the vertical members 120 and 126.

The ceiling forming plates 132 are preferably connected to the wall forming plates 110 by a continuous right angle structure that is welded to both plates and is preferably in the form of a 90° curved surface defining portion 138. It has been found that the curved structure for joining the two is superior to a true sharp right angle welded corner in several respects. First of all, the arcuate corner yields a final concrete curved corner structure 139 that is somewhat stronger than a sharp right angle corner structure would be by providing additional concrete mass at the joint or corner and, further, the arcuate upper corner facilitates the removal of the form from the finished concrete structure after pouring and setting of concrete. In addition, painting is made easier since a sharp corner need not be cut in by the painter.

It will also be noted that the plates 132 have their inner ends extending a short distance beyond the vertical plane defined by the vertical supports 126 and the plates 132 from the two interior forms 14 are abuttable as along the line 140 to define a continuous horizontal casting surface for the roof. To strengthen the plates in this area, the underlying reinforcements 134 also cantilever out and are tapered as at 142 to prevent interference of these members with one another during removal of the inner forms from a poured structure as will be understood hereinafter. Finally, distributed along the plate 110 near the bottom thereof are a plurality of screw jacks 142 for holding the forms 14 in fixed location after they has been moved into operative position on the casters. As is true of the external forms 16, the lifting of the internal forms 14 is preferably not performed by the screw jacks 142 but by hydraulic jack means as will be described hereinafter. The screw jacks are only brought into position to hold static load.

As presently desired, each of the external forms may be provided with a suitable catwalk structure 144 extending essentially the full length of the external form 16. This enables workmen to stand near the upper end of the walls for raking concrete during the casting operation in order to be sure that the roof to be poured is smooth. The particular nature of this structure forms no part of the invention per se although, clearly, it is a desirable optional feature. Of course, the structure must be strong enough to support several workmen. In addition, if desired, a hingeable hook 146 may be provided at both ends of one of the interior forms 14 to be hooked onto a protruding stud 148 on the other form 14 for being sure that the forms are held in fixed relation during the pouring operation. This is a desirable but optional feature of the structure.

With the above detailed description of the construction of the interior forms 14 and the exterior forms 16 in mind, and bearing in mind the fact that in the description of the method the floor slab 70 and the upstanding wall portions 72 have already been formed, it now becomes necessary to move the interior and exterior forms 14 and 16 into operative relation with the cast floor slab 70 to form the walls and ceiling. This is done by putting each of the interior forms 14 onto its respective casters 130 by slightly lowering the form. This is in turn done by the use of conventional, removable hydraulic jacks (not shown), which are first operated to pick up the load of the forms, and then by operating the screw jacks upwardly so that they will be above the lower elements of the casters 130 and then by lowering each of the forms by the hydraulic jacks until the casters 130 support the interior forms. Preferably, as already noted, the casters will rest in the channel-shaped tracks 76 that extends from some location off of the floor slab 70 and onto the floor slab for its full longitudinal extent. The forms 14 may then be pushed manually one at a time onto the floor slab 70.

Dividing the interior form into two form halves 14 greatly reduces the weight that must be pushed at one time and makes it relatively easy for several workmen to do this without even the use of any machine. Also, as will be made more clear hereinafter, the removal of one interior support 14 at a time permits their removal from one module in formation and into location to form another module in formation much sooner than if the entire interior form were unitary and moved simultaneously as a single unit.

The provision of the tracks helps assure a proper location of each of the interior forms 14 on the slab 70 of a module in formation. This location is further aided by the provision of the upstanding wall portions 72 which serve as a guide for the interior forms 14. Thus, each interior form is separately moved onto slab 70 and is located so that the plate 110 rests against wall portion 72 and the ends thereof are in register with the ends of the slab 70. In this position, hydraulic jack means may be placed under the forms 14 to raise the form to lift the casters 130 off of the channel-shaped tracks 76 and to hold them in this position while the screw jacks 130 are operated to move downwardly into engagement with the floor slab 70 or tracks 16 to thus hold the form in the described position. Thereafter, the hydraulic jacks may be removed, if desired, or they may remain in place. Then, the exterior forms 16 are moved on their casters to outside of the steel reinforcing framework and into confronting relation with the interior form halves. Since the exterior forms do not run on the floor slab 70 of a module in construction, tracks are not required. Ultimately, the plates 80 are brought into confronting relation with the outer surfaces of the upstanding bottom wall portions 72 and with the ends of the plate 80 coplanar with the ends of the interior forming plates 110. In this position, hydraulic jacks are placed under the exterior forms 16 to jack them up to take the casters 102 off the underlying supporting surface, the screw jacks 106 are moved downwardly to support the forms and then the hydraulic jacks may or may not be removed.

Figure 17:
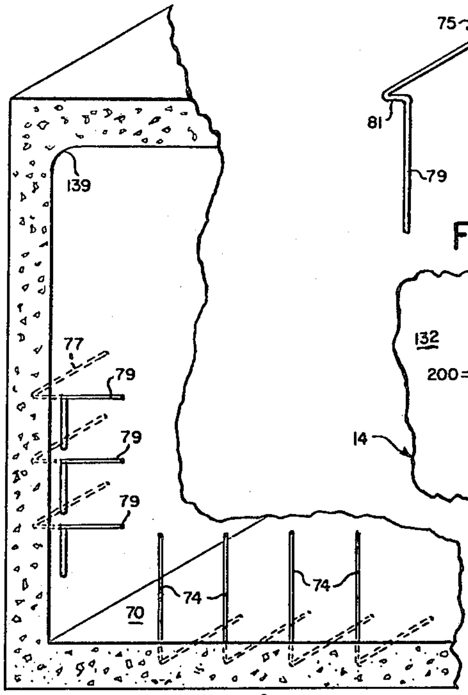
FIG. 17 is a fragmentary perspective view of a concrete module in which the floor, walls and ceiling structure have been cast, said module being in condition to have an end wall structure cast therein.
Figure 18:
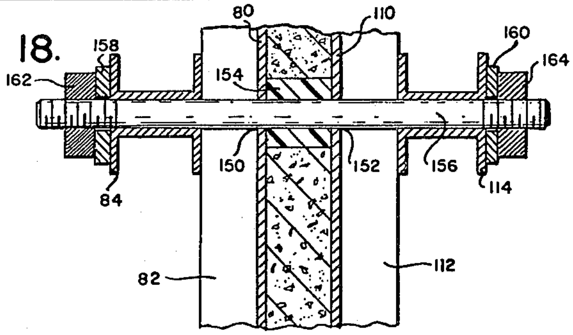
FIG. 18 is a fragmentary view, partially in section and partially in elevation, showing the details of a tie rod assembly for holding the interior and exterior forms in proper horizontal alignment and with the appropriate spacing for the formation of the wall of the module to be cast.

To be sure that the interior and exterior forms are properly aligned with one another in mutual alignment of all four, the hooks 146 are employed to hook the interior forms together thereby assuring their alignment. As shown in FIG. 18, tie rods are provided to tie the interior and exterior confronting forms 14 and 16 to one another. It is for the purpose of accommodating the tie rods that it is presently preferred to employ spaced apart pairs of channel members 84, 86 and 114 and 116, although other structural shapes may be employed to accommodate tie rods which will be hereinafter described in greater detail. The plates 80 and 110 are provided with registrable apertures 150 and 152 in the planes defined by the spaces between confronting pairs of channels 84, 86 and 114 and 116. When the forms 14 and 16 are aligned but widely spaced apart, these apertures 150 and 152, respectively, are in alignment. When so located, spacer sleeves 154 of longitudinal extent equal to the thickness of the wall to be cast are disposed between the plates 80 and 110 to space the plates precisely at the desired distance, for example, four inches. The sleeves are made of a material which has a very low adhesion to concrete such as, for example, polyvinylchloride (PVC) or other suitable plastic. The interior bore of the spacer sleeves 154 is approximately equal to the diameter of the aligned apertures 150 and 152 in the plates 80 and 110, respectively. A steel tie rod 156 having threaded ends is slipped through the apertures and the central bore of the sleeve 154. The tie rods 156 are long enough to extend beyond the outer flanges of the confronting pairs of channels 84, 86, 114 and 116, as the case may be when the forms are in proper confronting relation. In FIG. 17, channels 84 and 114 are shown by way of illustration. If desired, a washer 160 is disposed on the inner threaded end of the tie rod 156 up against the outer surfaces of the flanges of the channels 114 and a nut 164 is threaded onto the threaded ends of the tie rod. Preferably, the washer and nut are integral. Then, the sleeves 154 are disposed on the tie rods 156 up against the outer surface of the plates 110. Then, the external forms 16 are moved in towards the interior forms 14. Assuming the apertures 152 are properly located by the proper positioning of the external forms relative to the internal forms, the apertures 152 in the plates 110 will receive the protruding tie rods 156 without interfering with the inward movement of forms 16. The inward movement will continue until the plates 80 come up against the outer ends of the sleeves 154. At that point washers 158 may be slid onto the free outer ends of the tie rods 156 and the nuts 162 may be threadedly engaged on the external threaded portion of the tie rods to bring them into tight engagement with the washers 162. Tightening is continued until the plate 80 is bearing tightly against the outer edges of the sleeves 154, whereby to locate the plates 80 at precisely the distance from the plates 110 equal to the intended thickness of the side walls, namely, for example, four inches. This completes the assembly of the forms for the walls and the ceiling save for the ends of the forms.

Figure 13:
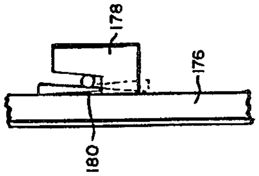
FIG. 13 is a fragmentary side elevational view showing the means for holding the vertical end plates for the moulds in close association with the internal and external forms prior to the pouring of the completed concrete structure.
Figure 12:
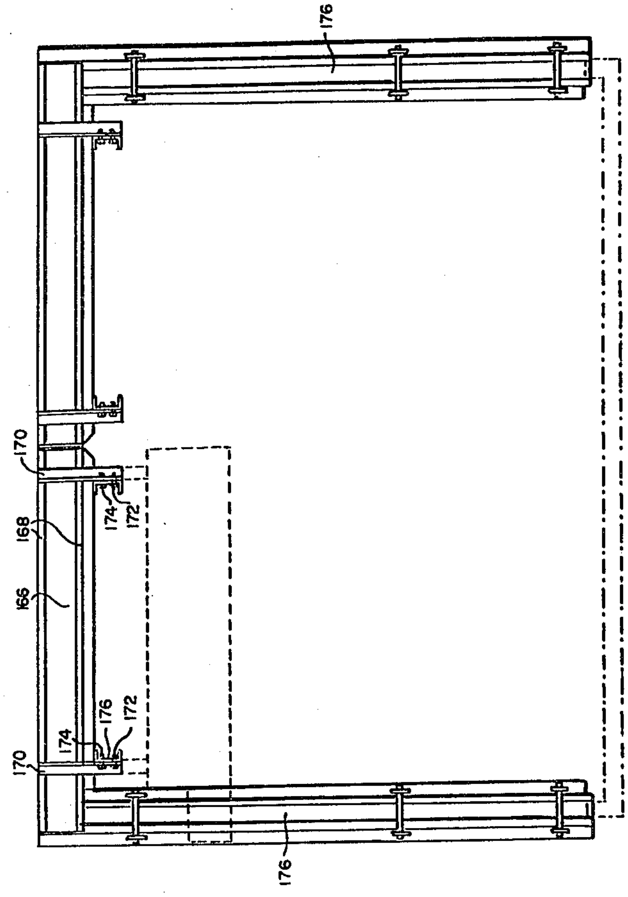
FIG. 12 is an end view of the forms of FIG. 11, showing the end plate construction therefor, a number of parts being deleted in order to more easily understand said end plate construction.

The end form structure is best illustrated in FIGS. 12 and 13. Specifically, the upper portion of the end structure which will define the ends of the roof, are defined by two plates 166 at each end, one associated with each internal form 14. The plates 166 may be reinforced as by channels 168 and are connected to vertical members 170 in the form of angle irons. Adjacent the bottom of the angles 170 are suitable nuts and bolts 172 on which the angles may pivot. These bolts are fixed to channels 174 that are secured to the internal form structure. Thus, the plates 166 may be pivoted from the operative position shown in solid lines in FIG. 12 to an inoperative position shown in dotted lines in such figure. To hold the plates 166 in the operative position, bolts 176 are associated with each of the channels 174 and fit into a groove in the angle irons 170 where they may be tightened to hold the angle irons and hence the plates 166 in the solid line position of FIG. 12. The lower portions of the end structure are defined by suitable members which may be made of any material such as wood or the like that bridge the spaces between the plates 80 and 110. These members are designated by the reference numeral 176. To hold the members 176 against the ends of the plates 80 and 110, suitable hook-like structures (see FIG. 13) are welded onto the ends of the interior and exterior form structures to protrude outwardly therefrom, the hook-like structures being designated by the reference numerals 178. Rods 180 are laid into the hook structures 178 up against the outer surfaces of the members 176. Then wedges 182 are driven between the rods 180 and the members 176 to firmly press and hold the members 176 against the edges of the plates 80 and 110 of the forms. This completes the assembly of the forms for the walls and ceilings.

Clearly, before the forms are so assembled, they should be sprayed or otherwise coated with a suitable form oil to facilitate their removal after casting and setting of the concrete. Not only are the plates 80 and 110 so coated, but the roof plates 132 and the end structures just described. It will be obvious that this coating of form oil can be achieved more easily if it is done before final assembly of the forms into the configuration illustrated in FIGS. 11, 14 and 15.

With the forms so assembled, reinforcing rods may be disposed for the roof structure, some of these reinforcements being transverse and tied into the horisontal end stubs 26 of the U-shaped members as by wire or the like, others extending longitudinally and being tied to the transverse members by wire or the like. This operation is best done after the forms have been located since the forms themselves can serve to support workmen while doing this operation. Also, if any electrical outlets are to be provided in the ceiling, such as, for example, a ceiling lighting fixture or the like, electrical conduits are laid into the ceiling and tied into the conduits in the wall structure at this point. Now the walls and roof are ready to be poured.

Again, as was true with the floor, the particular kind of concrete mix employed is dependent upon the process being used and the ultimate properties being sought. However, as presently employed and as presently preferred the concrete mix is the same as that employed in the floor. The concrete is poured into the spaces between the plates 80 and 110 on both sides to the full height of the walls and then across the plates 132 to the thickness desired for the roof. Generally speaking the thickness of the roof is desired to be a nominal four inches, although a pitch for the roof is desirably provided for proper rain water drainage. Thus, in practice, the roof thickness at one end of the module may be, for example, four-and-a-half inches and the roof thickness at the opposite end may be, for example, three-and-a-half inches with a steady planar taper between these two ends. The concrete is hoisted to the top for pouring in any suitable manner such as, for example, by a payloader or the like, although manual means or a crane may be employed for this purpose.

Preferably, although not necessarily, a parapet is poured along each side of the structure above the wall for the purpose of assuring proper drainage and preventing rain water from flowing over the outsides of the walls. To provide for a parapet, each of the plates 80 should extend vertically upwardly beyond its companion plate 110 by more than the proposed nominal thickness of the roof slab as would be true without a parapet. Thus, for example, if a parapet is to be included, the plates 80 should extend up beyond the upper edge of the plates 110 by a distance at least equal to the thickness of the roof slab (e.g., four inches) plus the height of the parapet (e.g., three inches) or a total in the example given of seven inches. Extending inwardly from each of the plates 80 at the top thereof are a number of metal or wooden straps 180 which are cantilevered as shown. Secured to the underlying surface of each of these straps 180 and extending for the full length of the module in formation is a suitable member such as a wooden stud 182 which depends from the straps 180 for a distance equal to the height of the parapet. The lower surfaces of the studs 182 define the nominal upper surface of the roof in formation. The concrete is sufficiently viscous that it will support the upstanding parapets even before the concrete actually cures. Clearly, the studs 182 will have to be coated with form oil to permit their removal after the concrete sets.

Preferably incorporated into the reinforcement structure of FIGS. 3 and 4 during the wall-roof forming step are means for facilitating the lifting of a finished module off casting bed 15 after the concrete has fully cured or set. These means include four pairs of L-shaped reinforcing rods 200 each having the upper ends of the vertical portions thereof threaded as at 202. Rods 200 may be of the same stock as reinforcement 20 but $\frac{3}{4}$ inch diameter and extend above the parapet about 4 inches. The L-shaped reinforcements 200 are accordingly strongly incorporated into the concrete of the walls of the structure after it is fully cured. As indicated, preferably, there are four sets of such L-shaped rods 200, two pairs being associated with each of the sidewalls preferably about 6½ feet from the ends thereof.

Figure 20:
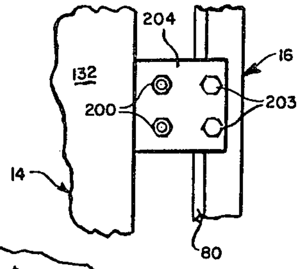
FIG. 20 is a fragmentary top plan view of the forms, prior to pouring the walls and the roof, and especially illustrating the incorporation of hoist connecting means into the structure.

As may be seen in FIG. 20, before the concrete is poured, during the forming step, guiding plates 204 having pairs of apertures 206 therein, which apertures are spaced apart by the spacing between the protruding threaded end portions 202 of the pairs of rods 200, are bolted to exterior forms 16 as at 203. To firmly hold the rods, nuts may be threadedly engaged on them and tightened to the plates. After the concrete is poured and cured, the temporary nuts on rods 200 are removed and the guiding plates are disconnected from forms 16 by unbolting them and then removed. Thereafter an eye fixture 208 including a base plate 210, a vertically extending stiffener 212 and a transversely extending eye member 214 is mounted by means of spaced apart apertures 215 on both sides of the eye which are spaced by a distance equal to the spacing between the threaded portions 202 of the L-shaped rods 200. Nuts are tightened down on the threaded end portions 202 to securely hold the eye fixture 208 to the concrete structure. With four of such eye fixtures so secured to the module, when the module has fully cured and is a self-supporting rigid concrete structure, a derrick can be brought into operative position with respect to the module and a sling having four ends can be hooked to the four eye members 214 to thereby lift the module off its casting bed and away from the assembly line. This may be seen in FIG. 1 where the hoist or derrick is designated by the reference numeral 200 although it will be understood that a crane type hoist can be employed in lieu thereof. The concrete is permitted to set. Clearly, if the interior forms 14 are removed before the concrete is sufficiently strong to be self-supporting the roof of the module will collapse. However, as previously pointed out, by dividing the interior forms into two half forms 14, the removal of the interior forms 14 can be greatly expedited. Clearly, the concrete as it sets gains strength as a function of time. Thus, it takes longer for the concrete to gain sufficient strength to support the entire span, for instance 11 feet, than it would to support a span of only half that distance. Hence, if only one half of the form is removed, it can be removed much sooner within the roof collapsing than if the form were removed in its entirety as one unit, since the span between the remaining form and the now uncovered wall is only half as long as the entire span. This cuts down by many hours the time that the internal forms 14 must be kept in place during the setting of the walls and roof. In practice, if only one form 14 is removed, the concrete will gain sufficient strength so that one-half of the span can be unsupported employing the concrete mix heretofore specified, in about 24 hours. After one of the internal forms has been removed, suitable shoring in the form of temporary columnar supports may be disposed within the module to extend between the floor slab 70 and the exposed or unsupported portion of the roof near the center or median strip. Once the columnar supports are distributed along the entire length of the roof median strip, the other form 14 may be removed since it also underlies only a one-half span, which is self-supportable. The removal of each of the forms 14 is achieved by moving the forms downwardly onto their casters 130 and thence longitudinally out from within the module along the channel-shaped rails 76. Clearly, this cannot be done until the tie rods 156 are removed as they will prevent longitudinal movement of the forms 14. After the tie rods have been removed the outer forms 16 may also be removed, this being done preferably before the removal of the interior forms 14 although, if desired, this could be done subsequently thereto. Once the forms 14 and 16 have been removed from the inner and outer surfaces of the module in formation, they are available to be employed to form yet another module as will be understood subsequently.

After the forms have been removed, which occurs about 24 hours after pouring, if end walls are to be incorporated into the module, then the end reinforcements 74 and 75 are bent out of the planes of the floor slab 70 and the walls and into the planes of the end walls. Simple wooden forms treated with a form oil are then erected to define an end wall structure and concrete is poured. Of course, if the end walls are to have doorways, windows or air conditioner sleeves, these are formed by suitable framing means before the end walls are actually poured. In this connection, it should be noted that the end wall reinforcements 75 that are in the side walls leave grooves in the side walls when they are bent into the plane of the end walls. These grooves serve to provide an additional interlock between the end walls and the side walls to further strengthen the module.

The concrete of the walls and roof is permitted to cure an additional two days. By then the concrete is strong enough to support its entire width. The shoring is removed and the completed module is removed by a hoist or derrick hooked to the four eyes 208. Before or after such removal, the plastic sleeves 154 are knocked out of the poured walls. This is done easily with a hammer blow. The hole left in the wall is subsequently patched with cement.

As previously indicated, the above described method finds its maximum utilization in an assembly line in which for each set of interior and exterior forms 14 and 16 there are four casting beds arranged so that the forms may be continuously progressed from one bed to the next without having to be moved back to the first past any previously used bed. Thus, for example, if only one set of forms were employed, and the assembly line consisted of four casting beds, a useful array would be a square array. When two sets of forms 14 and 16 are employed, a variety of arrays could be employed including a square array with two casting beds on each side of the square or an oval or circular array or just two parallel lines of four beds each. However, in such parallel array, one row or line of casting beds would be numbered 1, 2, 3 and 4 from left to right and the second row would be numbered 5, 6, 7 and 8 from right to left whereby to obviate the need when a form is moved off casting bed four that it be moved past 3, 2 and 1 in order to get to the fifth casting bed in the other row. Thus, the forms are moved in a circular or continuous flowing pattern.

At the present time, I contemplate employing my method in an assembly line comprising twelve casting beds 15 and three sets of forms 14 and 16. While the assembly line could be arranged in a square array with three casting beds on each side, I presently prefer to employ a two row parallel array with six on each row. One row, shown to be the lower row in FIG. 19, includes casting beds designated 1 through 6 from left to right whereas the upper row includes casting beds designated 7 through 12 from right to left. As will be seen the movement of the forms is cyclical or circular as indicated by the arrows incorporated in each of the squares illustrated in the condition of the assembly line on various days.

Figure 19:
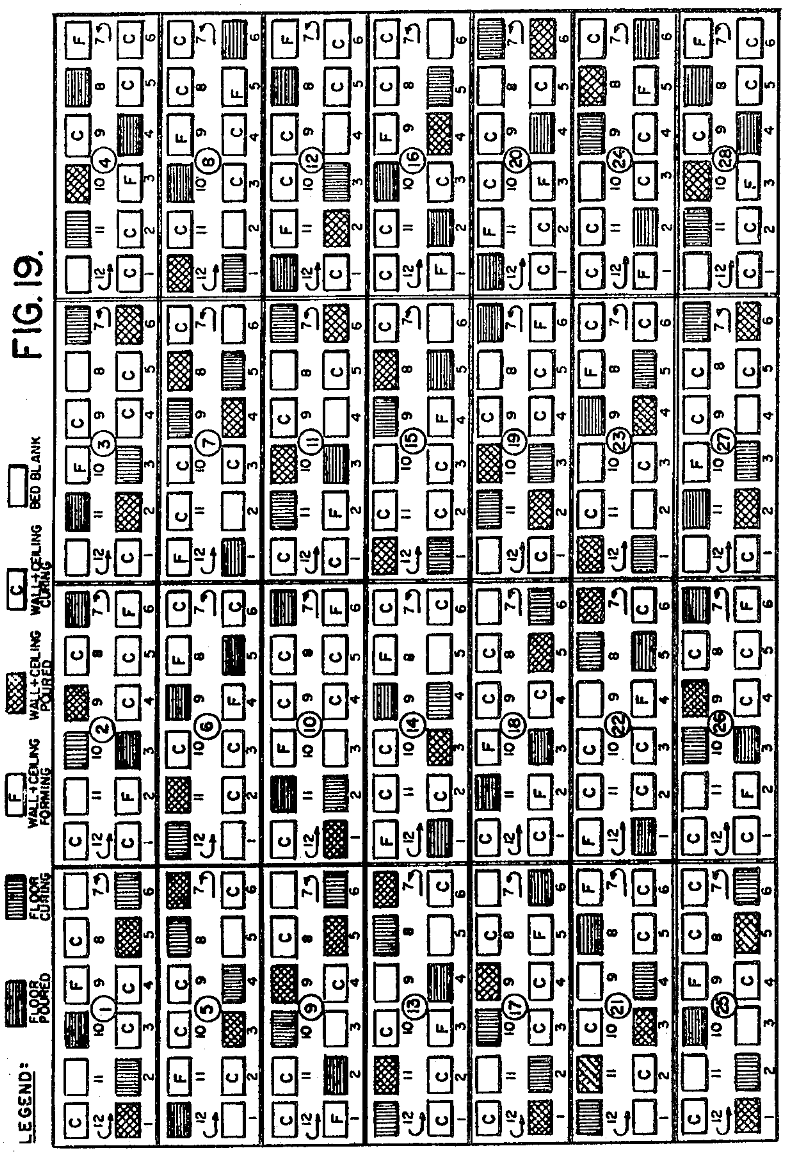
FIG. 19 is a diagrammatic view of an assembly line for making precast modules in accordance with the present method, the figure illustrating the condition of the assembly line on 28 consecutive days to show the manner in which the line is employed to maximize its production.

Referring now to FIG. 19, FIG. 19 is made up of twenty eight boxes each including a diagrammatic view of an assembly line embodying the present invention. The assembly line, as already noted, includes twelve casting beds arranged in two rows of six each, the casting beds in the lower row being designated 1 through 6 from left to right and the casting beds in the upper row being designated 7 through 12 from right to left. Each square designates the condition of the assembly line on a given day, the day being designated by a number enclosed in the circle in the middle of the array. While some minor variations may be permitted in the progression from day to day, by and large, given the nature of the concrete sections and concrete mixes employed herein, the pattern for a twelve casting bed array is substantially as shown in the various diagrams of FIG. 19. In interpreting FIG. 19, each of the rectangular boxes bearing the numbers 1 through 12 is diagrammatically representative of a casting bed. Each square including an array of twelve boxes represents the condition of the entire assembly line on the day designated in the square. To understand FIG. 19, the boxes having longitudinally extending hatching are boxes which represent a casting bed on which the floor slab 70 is being poured; the boxes having transversely or vertically extending hatching depict casting beds on which the floor slab concrete is curing; the boxes having crossed hatching depict a casting bed on which the walls and ceiling of a module are being poured; the letter "F" indicates a box wherein the forms 14 and 16 are being assembled; and the letter "C" depicts a casting bed on which the concrete forming the walls and roof is being permitted to cure. Blank beds are those which are not in actual use on the day shown.

Given the above key for understanding FIG. 19, day one is arbitrarily selected as a day on which casting bed 1 is occupied by assembled forms 14 and 16 and into which the walls and roof structure are being poured; casting bed 2 is occupied by a floor and lower wall portion slab 70–72 which is setting, casting beds 3 and 4 are occupied by completed concrete modules in which the walls and roof are curing; casting bed 5 is occupied by assembled forms into which is being poured the concrete for the walls and roof of a module; casting bed 6 includes a floor and wall section that is curing; casting bed 7 is blank, casting bed 8 is occupied by a completed module in which the walls and roof structure are curing; casting bed 9 is occupied by the forms 14 and 16 being moved thereon from casting bed 8 and being assembled in preparation for casting the walls and roof structure to complete a module; casting bed 10 is a casting bed in which the steel reinforcement for a floor and walls is erected, as illustrated in FIGS. 2, 3 and 4, the floor forms 50 and 52 are being installed and the floor slab 70 and lower wall portions 72 are being cast (all in one day, namely day one); casting bed 11 is blank; and casting bed 12 includes a modular structure which is complete but in which the concrete walls and roof are fed in.

Day two represents the progression of the assembly line from day one. Thus, if on day one at concrete casting bed 1, the walls and roof structure are poured as already described, then on day two that poured structure is being cured. As previously mentioned, after twenty four hours of setting of the walls and roof structure, because of the split nature of the interior forms 14, those forms can be removed one at a time and a temporary shoring can be installed inside to support the setting roof, whereby to free the forms for movement to casting bed 2. The position of the forms being assembled at casting bed 2 is shown for day two. This movement of the forms on the casting bed 2 is permitted by virtue of the fact that the previously poured floor and lower wall portion slab had already cured at casting bed 2 during day one to receive the forms on day two without damage, especially if rails overlie the partially cured floor slab. At casting bed 3 on day two, the complete module that was curing on day one will have cured for three days and will thus be removed, whereby to free casting bed 3 for the erection of the walls and floor steel structure and the pouring of a floor and lower wall portion slab 70–72. On day two at casting bed 4, the wall and ceiling structure previously cast before day one continues to cure. At casting bed 5, the wall and ceiling structure cast on day one have cured for about one day by the time day two is reached. Thus, the forms used to cast the walls and roof structure at casting bed 5 on day one can be removed on day two and moved to casting bed 6 for assembly. At casting bed 7, which was not in use on day one, on day two there occurs the erection of the steel reinforcement structure for the walls and floor slabs and the pouring of the floor slab 70 and the lower wall portions 72. At casting bed 8 on day two the walls and roof structure cast prior to day one will continue to cure. At casting bed 9 on day two a wall and roof structure will be cast using the forms 14 and 16 that were assembled on casting bed 9 during day one. At casting bed 10, the floor slab and lower wall section 70–72 that were poured on day one will cure to condition them for receiving forms 14 and 16 on day three. Casting bed 11 remains unused on day two and casting bed 12 continues to be occupied by a wall and roof structure that was originally cast prior to day one.

While, of course, a detailed description of the condition of the assembly line shown in FIG. 19 for each day illustrated can be presented herein, this would seem to be unnecessarily prolix in light of the fact that given the key and the description already presented, the figure itself is self-explanatory. Suffice it to say, it will be seen that on any given day, concrete is poured at three casting beds, either two floor and one wall-roof structure or two wall-roof structures and one floor. It will also be seen that on the day in which one wall and roof structure is being poured, such as the day two, the forms for making a wall and roof structure are being assembled at two other casting beds. If one follows the forms F from day to day, it will be seen that they progress in an orderly fashion from casting bed 1 serially through casting bed 12. They are never skipped around and they are moved in an efficient, direct and orderly fashion to minimize the handling thereof. Finally, an analysis of FIG. 19 will indicate that a set of forms with four casting beds produces one completed module every two days whereby the triple array shown in FIG. 19 is capable of producing three modules every two days.

To the best of my knowledge no one has ever conceived of the assembly line of this type wherein the casting beds are arranged for a continuous, serial and orderly progressive operation to reduce the handling of forms and the like. This greatly facilitates the capability of the forms and entire assembly line structure to produce at the rate above described.

While I have shown and described the preferred form of this invention and have suggested various modifications thereof, other changes and modifications may be made therein within the scope of the appended claims without departing from the spirit and scope of this invention.

I claim:

1. A method for forming, on a casting bed, a precast concrete box like building module of the type having a floor, a pair of spaced apart side walls extending up from said floor, and a roof extending between the upper ends of said side walls; said method comprising the steps of: (a) integrally casting simultaneously a concrete floor slab and the lower portions of the concrete side walls; (b) moving onto the floor slab after the concrete has at least partially cured a pair of interior forms each of which includes a vertical plate for defining the interior surface of one of said side walls and a horizontal plate at the upper end of the vertical plate for defining a portion only of the interior surface of said roof, each of said interior forms having been moved to bring its vertical plate into alignment with the interior surface of one of said lower portions of said side walls; (c) pouring the remainder of said concrete side walls and roof; (d) permitting the wall and roof concrete to cure sufficiently to render self-supporting a portion only of the roof concrete; (e) removing one of said interior forms to leave said portion only of the roof concrete unsupported; (f) shoring said unsupported portion of said roof concrete; and (g) then removing the other of said pair of interior forms from within said module, whereby said pair of interior forms has been removed from said module after a curing time less than the curing time required to render the entire roof self-supporting.

2. The method of claim 1 further including after said pouring step, the step of inserting into said poured concrete walls at the top thereof means for connecting to fixtures for connecting said module to a lifting mechanism.

3. The method of claim 1 further including before said moving step, the step of positioning, outside of said floor slab, a pair of exterior forms, each having a vertical plate for defining the exterior surface of one of said side walls.

4. The method of claim 1, further comprising the step of constructing a steel reinforced grid prior to said casting step, said grid comprising a plurality of longitudinally spaced U-shaped reinforcement members having a bight of length greater than the interior width of said module and less than the exterior width thereof, and a pair of vertically extending arms, and a plurality of longitudinally extending reinforcement rods connected to said arms and to said bights to form a rectangular reinforcement grid.

5. The method of claim 4, wherein the arms of said U-shaped reinforcement members extend vertically a distance greater than the interior height of said module and less than the exterior height thereof, said U-shaped reinforcement members having at the upper end of each arm an inwardly directed section.

6. The method of claim 5, further comprising the step of connecting into said reinforcement grid prior to said casting step electrical conduits and plumbing piping.

7. A method for forming a precast concrete box-like building module of the type having a floor, a pair of spaced apart side walls extending up from said floor, and a roof extending between the upper ends of said side walls; said method comprising the steps of:

(a) casting a concrete floor slab;
(b) moving onto the concrete floor slab after said concrete has at least partially cured a plurality of interior forms for collectively defining the interior surface of said side walls and roof, each of said interior forms including a horizontal plate for defining a portion only of the interior surface of said roof;
(c) pouring said concrete side walls and roof;
(d) permitting the wall and roof concrete to cure sufficiently to render self-supporting a portion only of the roof concrete;
(e) removing one of said interior forms to leave said portion only of the roof concrete unsupported;
(f) shoring said unsupported portion of said roof concrete; and
(g) then removing another of said interior forms.

8. The method of claim 7 wherein two interior forms are moved onto the concrete floor slab, each of which has a horizontal plate for defining a portion only of said roof, the sum of the widths of said horizontal plates being substantially equal to the interior width of said module.

9. The method of claim 8 wherein each of said horizontal plates has a width which is approximately one-half the interior width of said module.

10. A method for forming, on a casting bed, a precast concrete box-like building module of the type having a floor, a pair of spaced apart side walls extending up from said floor, and a roof extending between the upper ends of said side walls; said method comprising the steps of:

(a) casting a concrete floor slab;
(b) positioning outside of said floor slab a pair of exterior forms each having a vertical plate for defining the exterior surface of one of said side walls;
(c) moving onto the concrete floor slab after said concrete has at least partially cured a plurality of interior forms for collectively defining the interior surface of said side walls and roof, each of said interior forms including a horizontal plate for defining a portion only of the interior surface of said roof;
(d) pouring said concrete side walls and roof;
(e) permitting the wall and roof concrete to cure sufficiently to render self-supporting a portion only of the roof concrete;
(f) removing one of said interior forms to leave said portion only of the roof concrete unsupported;
(g) shoring said unsupported portion of said roof concrete; and
(h) then removing another of said interior forms.

* * * * *